Patented Dec. 5, 1922.

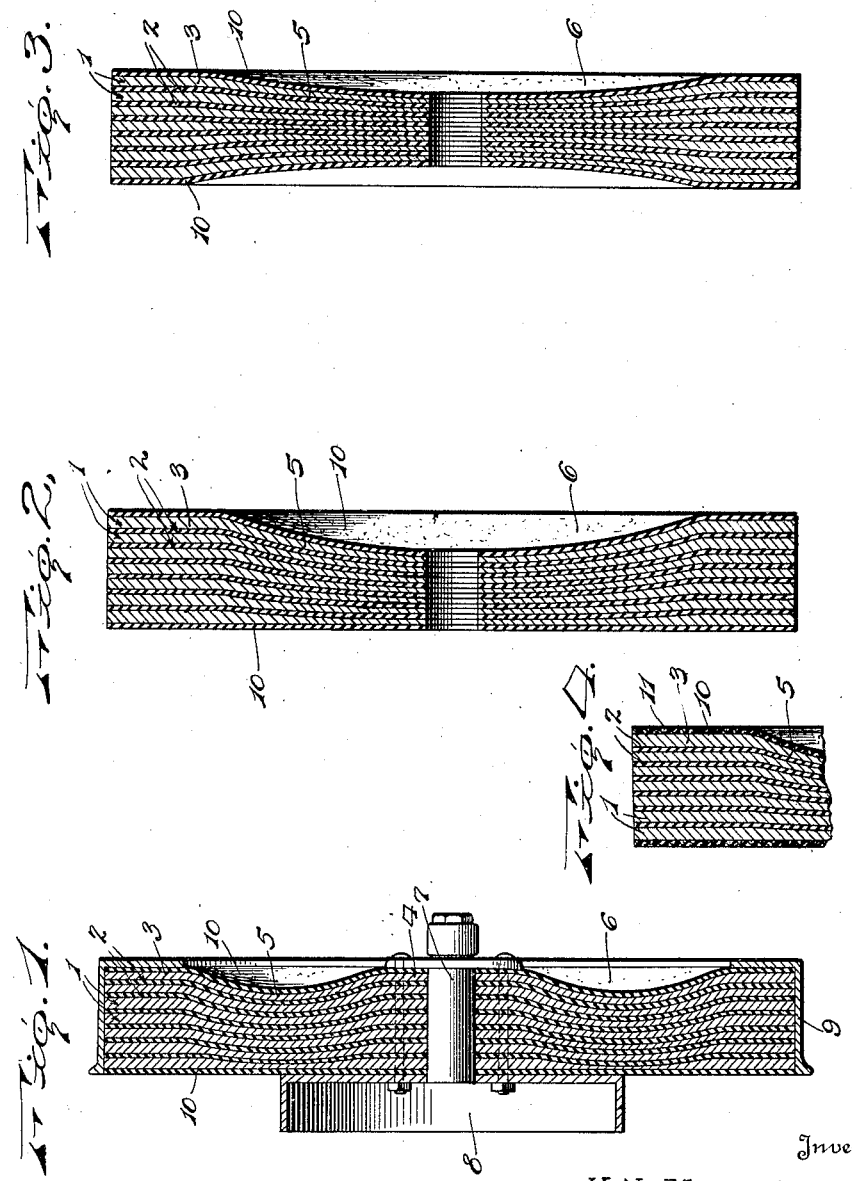

1,437,482

UNITED STATES PATENT OFFICE.

HARRY N. ATWOOD, OF SMITHFIELD, NORTH CAROLINA, ASSIGNOR TO RUBWOOD, INC., OF LAWRENCE, MASSACHUSETTS, A CORPORATION OF MASSACHUSETTS.

VEHICLE WHEEL STRUCTURE AND METHOD OF PRODUCING SAME.

Application filed December 10, 1921. Serial No. 521,372.

*To all whom it may concern:*

Be it known that I, HARRY N. ATWOOD, a citizen of the United States, residing at Smithfield, in the county of Johnston and State of North Carolina, have invented certain new and useful Improvements in Vehicle Wheel Structures and Methods of Producing Same, of which the following is a specification.

This invention relates to improvements in vehicle wheels and more particularly to an automobile wheel comprising a plurality of veneer plies bonded together to provide a substantially integral structure. It has previously been proposed by me, as for example in my application for patent for laminated composite wheels filed jointly with George B. Bains, 3rd, December 24, 1920, Serial No. 432,939, renewed November 16, 1921, Serial No. 515,695, to construct a vehicle wheel by building up the body of the same from plies of veneer united by interposed rubber bonding plies, and in that structure the veneer plies are of uniform thickness and they are of such marginal contours that when properly assembled a wheel body of the required shape will be produced. While such a structure is substantial and durable and in every way practical to manufacture, the present invention has as one of its primary objects to provide a wheel body of even more substantial and durable structure and possessing certain advantages not present in the previously designed structure. The invention also contemplates a novel method of producing a wheel body of this general type.

Another object of the present invention is to provide a wheel body of the type above referred to in which the veneer plies are initially all of substantially the same marginal contour and dimensions and are so acted upon by the method of the invention that the completed wheel body will possess the required shape and yet in its production there will be no mutilation or impairment of strength of the said plies.

Another object of the invention is to provide a wheel body of the type referred to of such construction that it will possess a maximum degree of resiliency and yet be of great strength and of the required degree of rigidity where these properties are essential or desirable.

A further object of the invention is to provide for the permanent union, with a wheel body of the type referred to above, of a standard felloe band so that the band will constitute an integral part of the body and not require to be secured thereto by the usual fastening means.

In the accompanying drawings:

Figure 1 is a diametric sectional view through a wheel body constructed in accordance with the present invention and provided with standard equipment such for example as the hub, brake drum, and felloe band;

Figure 2 is a diametric sectional view through a wheel body of a modified form embodying the invention;

Figure 3 is a similar view illustrating another modification; and

Figure 4 is a similar view illustrating a further modification.

In accordance with the present invention a vehicle wheel body may be constructed of any required surface or cross sectional contour, and ordinarily it will be desirable to form one or both faces of the body more or less dished or concave at or adjacent its central portion and preferably circular. If the body were made up of veneer plies of uniform thickness throughout their area, it would be necessary to work the body to the required contour after it had been completed in blank form or to initially fashion the plies of various marginal contours as in the co-pending application, in order to produce the required shape. However by the present invention the expense and labor involved in this work is avoided and a more substantial structure is produced. In the several figures of the drawings the veneer plies are indicated in general by the numeral 1 and the interposed rubber bonding plies by the numeral 2. In building up the structure the veneer plies 1 are initially cut of a uniform size and marginal contour and while in a wet or moist state, either naturally or by artificial impregnation, they are subjected, either singly or collectively, to pressure and heat in suitable moulds or forms. As a result of this step the plies are dished or otherwise distorted from their plane form and caused to assume the surface and cross sectional contour which they are to permanently possess. Also during this step the moisture is expelled and the plies are thoroughly dried so that when delivered from the mould or form they will be of the required contour and will permanently maintain the same. In this step of the method portions of the plies will be subjected to greater degrees of pressure than others so that the finished ply will be of varying thicknesses in cross section at various points between its center and its periphery. Thus for example the plies 1 in the form of the invention shown in Figure 1 of the drawings have peripheral portions 3 and hub portions 4 which are of substantially uniform and equal thickness, the intervening portion 5 of each ply being however of less thickness and deflected or distorted from the plane occupied by the portions 3 and 4. Also in this form of the invention one side, namely the inner side, of the wheel body is substantially flat whereas the outwardly presented side is dished as indicated by the numeral 6. In order that the veneer plies 1, when properly assembled may produce a wheel body of this general contour, the intervening portions 5 of the several plies in the order arranging from the dished face 6 to the opposite flat face, are successively of gradually decreasing degrees of curvature or dish, and the thickness of these portions is also varied as found expedient in order to produce the desired form.

In subjecting the veneer plies to the moulding step above described, and in which step the plies are in a wet or moist condition, the portions of the plies where the greater degree of pressure is applied are reduced in thickness or compacted and thus rendered more dense than the portions 3 and 4 for example and which latter portions are subjected to a lesser degree of pressure. The moulding of the plies to the required form however does not in any way result in injury to or impairment of the strength of the fibers inasmuch as the fibers are merely compressed or compacted and the pores of the plies condensed. Therefore there is no cutting or breaking of the fibers such as would tend to weaken the ply and render it less durable and resilient. It will be noted that in thus shaping the veneer plies, the wheel body as a whole is rendered denser, less rigid, stronger, and more resilient, throughout the area and at the points where these qualities are most essential and desired whereas the hub and peripheral portions of the body are relatively rigid and thus perfectly adapted for the application of the usual fittings.

Having formed the several component veneer plies of the wheel body in the manner above described, these plies are assembled in the proper order, and the rubber bonding plies 2 are interposed between them, these latter plies being preferably of uniform thickness and being of uncured or semi-cured sheet rubber. The assemblage is then subjected to heat and pressure or otherwise treated by a process of vulcanization in which step the bonding plies will become intimately incorporated with the veneer plies and the assemblage will be delivered as a composite and substantially integral whole.

In Figure 1 the wheel body is illustrated as provided with the usual standard equipment such for example as a hub 7, brake drum 8, and felloe band 9, and as concerns this latter part, it may be found desirable to employ the same as a part of the mould during the process of vulcanization so that as a result of this step in the method, the band will become a substantially integral and permanent part of the wheel body and will be maintained in place thereon without the employment of the usual extraneous fastening means such as bolts or rivets.

Preferably certain of the plies 2 are arranged over the side faces of the body and will therefore constitute facing plies indicated by the numeral 10, these plies serving to impart a finished appearance to the assemblage and also to protect from moisture the adjacent veneer plies.

The form of the invention shown in Figure 2 of the drawings is substantially the same as that shown in Figure 1 the exception being that in this instance the central or hub portions of the veneer plies are thinned substantially to the same degree as the portions 5. This is true likewise of the structure shown in Figure 3 in which latter form however both faces of the wheel body are dished. As illustrated in Figure 4 of the drawings, sheets of wire mesh or other suitable foraminous material 11 may be embedded in the facing plies 10 to constitute an integral reinforcing part thereof. In this connection it will also be understood that similar sheets of foraminous material might be embedded in the bonding plies for a like purpose.

Having thus described the invention what is claimed as new is:

1. The method of producing a vehicle wheel body which comprises subjecting fibrous plies in a moist condition to heat and pressure whereby to increase the density of portions thereof and cause the same to assume a permanent predetermined form, and uniting said plies.

2. The method of producing a wheel body which comprises subjecting fibrous plies in a moist condition to heat and pressure whereby to increase the density of portions thereof and cause the same to assume a permanent predetermined contour, interposing bonding plies of rubber material between the first mentioned plies, and subjecting the whole to a process of vulcanization.

3. The method of producing a wheel body which comprises subjecting moist veneer plies to heat and pressure until dry whereby to cause said plies to assume a permanent predetermined contour, assembling the plies with intervening plies of bonding material, and subjecting the whole to heat and pressure whereby to effect an intimate union of all of said plies.

4. The method of producing a wheel body which comprises subjecting moist veneer plies to heat and pressure to impart thereto a permanent predetermined contour and to increase the density of portions of said plies and continuing said step until the moisture has been expelled from the plies, assembling the plies with intervening plies of bonding material of uniform thickness, and subjecting the assemblage to heat and pressure whereby to effect an intimate union of all of said plies.

5. The method of producing a wheel body which comprises subjecting a plurality of moist veneer plies to heat and pressure in forms designed to impart thereto a permanent predetermined surface contour and to effect a densifying of the fibers of portions of said plies, assembling the plies with intervening bonding plies of rubber material of uniform thickness, and subjecting the whole to heat and pressure whereby to effect vulcanization.

6. The method of producing a wheel body which comprises subjecting a plurality of moist veneer plies to heat and pressure in forms designed to impart thereto a permanent predetermined surface contour and to effect a densifying of the fibers of portions of said plies, assembling the plies with intervening bonding plies of rubber material of uniform thickness, applying plies of rubber material to the exposed faces of the outermost veneer plies of the assemblage, and subjecting the whole to heat and pressure whereby to effect vulcanization.

7. The method of producing a wheel body which comprises producing a plurality of veneer plies of uniform marginal contour and of uniform thickness, subjecting the peripheral portions of the plies, while the plies are in a moist condition, to heat and to pressure and their portions inwardly of their peripheral portions to heat and to pressure of a higher degree than their said peripheral portions, whereby to densify the last mentioned portions of the plies and impart thereto a permanent predetermined surface contour, and bonding the plies together.

8. A vehicle wheel body comprising plies of fibrous material bonded together and of various thickness in different portions of their area to define the surface contour of the said body.

9. A vehicle wheel body comprising plies of fibrous material bonded together and of varying density in different portions of their area.

10. A vehicle wheel body comprising plies of fibrous material and intervening plies of bonding material uniting the same, the first mentioned plies having portions of their area compressed to less thickness than the other portions whereby to define the surface contour of the sides of the body and increase the density of said portions.

11. A vehicle wheel body comprising plies of fibrous material and intervening plies of bonding material uniting the same, the first mentioned plies having portions of their area compressed to less thickness than other portions and distorted from the plane thereof whereby to define the surface contour of the sides of the body and increase the density of said portions.

12. A vehicle wheel body comprising plies of fibrous material and intervening plies of bonding material uniting the same, the first mentioned plies having portions of their area compressed to less thickness than other portions and distorted from the plane thereof whereby to define the surface contour of the sides of the body and increase the density of said portions, the said bonding plies being of uniform thickness.

13. A vehicle wheel body comprising plies of veneer and intervening plies of bonding material uniting the same, the first mentioned plies having their portions inwardly of their peripheral portions compressed to less thickness and greater density than the said peripheral portions.

14. A vehicle wheel body comprising plies of veneer and intervening plies of bonding material uniting the same, the first mentioned plies having their portions inwardly of their peripheral portions compressed to less thickness and greater density than the said peripheral portions, the said densified portions of the plies being distorted in relatively varying degree throughout the assemblage to define the surface contour of the sides of the body.

15. A vehicle wheel body comprising plies of fibrous material bonded together and of varying thickness and density in different portions of their area, and facing plies united to the outer faces of the outermost plies of the assemblage.

16. The method of producing a vehicle wheel body which comprises assembling plies of veneer and intervening bonding plies of rubber material, disposing the assemblage within a felloe band, and subjecting the assemblage to heat and pressure whereby to effect union of all of said plies by vulcanization and a union of the peripheral portions of the plies to the said felloe band.

17. A vehicle wheel structure including a body comprising plies of veneer and intervening bonding plies of rubber material united by a process of vulcanization, and a felloe band surrounding the periphery of the ply assemblage and bonded thereto and constituting an integral part therewith.

18. A vehicle wheel structure including a body comprising plies of veneer and intervening bonding plies of resilient material, and a felloe band surrounding the periphery of the ply assemblage and bonded thereto and constituting an integral part therewith.

19. A vehicle wheel body comprising plies of material and intervening plies of resilient bonding material uniting the same, the first mentioned plies having portions of their area compressed to less thickness than other portions.

20. The method of producing a vehicle wheel body which comprises subjecting plies of material to pressure whereby to increase the density of portions thereof and cause the same to assume a permanent predetermined form, and uniting said plies.

21. A vehicle wheel body comprising plies of material compressed to produce the desired contour in the finished product, and intervening bonding plies uniting the first mentioned plies.

22. A vehicle wheel body comprising plies of material compressed to produce the desired contour in the finished product, and intervening resilient bonding plies uniting the first mentioned plies.

23. A vehicle wheel body comprising plies of material compressed to produce the desired contour in the finished product, and intervening rubber bonding plies uniting the first mentioned plies.

In testimony whereof I affix my signature.

HARRY N. ATWOOD. [L. S.]